US012504650B2

(12) United States Patent
Boinnard et al.

(10) Patent No.: US 12,504,650 B2
(45) Date of Patent: Dec. 23, 2025

(54) PRESCRIPTION LENS INSERT FOR EYEWEAR

(71) Applicant: 100% SPEEDLAB, LLC, San Diego, CA (US)

(72) Inventors: Ludovic Francis Boinnard, San Diego, CA (US); Marc Guy Blanchard, Solana Beach, CA (US); Dennis C. Tan, San Diego, CA (US); Jamie Oman, San Diego, CA (US); Michael D. Young, San Diego, CA (US)

(73) Assignee: 100% Speedlab, LLC, San Diego, CA (US)

( * ) Notice: Subject to any disclaimer, the term of this patent is extended or adjusted under 35 U.S.C. 154(b) by 331 days.

(21) Appl. No.: 18/555,572

(22) PCT Filed: Apr. 15, 2022

(86) PCT No.: PCT/US2022/025101
§ 371 (c)(1),
(2) Date: Oct. 16, 2023

(87) PCT Pub. No.: WO2022/221718
PCT Pub. Date: Oct. 20, 2022

(65) Prior Publication Data
US 2024/0126103 A1    Apr. 18, 2024

Related U.S. Application Data

(60) Provisional application No. 63/175,468, filed on Apr. 15, 2021.

(51) Int. Cl.
*G02C 7/08* (2006.01)
*G02C 9/04* (2006.01)

(52) U.S. Cl.
CPC ............... *G02C 7/086* (2013.01); *G02C 9/04* (2013.01); *G02C 2200/06* (2013.01); *G02C 2200/32* (2013.01)

(58) Field of Classification Search
CPC ...... G02C 7/086; G02C 9/04; G02C 2200/06; G02C 2200/32
See application file for complete search history.

(56) References Cited

U.S. PATENT DOCUMENTS

2006/0203187 A1\* 9/2006 Pieterman ................ G02C 9/00
351/57

FOREIGN PATENT DOCUMENTS

| EP | 1388332 A1 | 2/2004 |
|----|------------|--------|
| JP | 11095176 A | 4/1999 |

(Continued)

OTHER PUBLICATIONS

International Search Report and Written Opinion of the International Searching Authority from the European Patent Office, in PCT/US2022/025101 dated Jul. 27, 2022, which is an international application to which this application claims priority.

*Primary Examiner* — James C. Jones
(74) *Attorney, Agent, or Firm* — Kolitch Romano Dascenzo Gates LLC

(57) ABSTRACT

A prescription lens insert and methods of use are described, in which flexing a frame of a prescription lens insert, such that left and right rims of the frame are displaced mediolaterally, aligns respective larger ends of two keyhole apertures of the frame with left and right mushroom-shaped connector pegs protruding rearward from a pair of protective glasses. The prescription lens insert is then placed over the left and right connector pegs, such that distal heads of the connector pegs pass through the two keyhole apertures of the frame and the keyhole apertures are disposed adjacent shaft portions of the connector pegs. The frame of the prescription (Continued)

lens insert is then unflexed to align respective smaller ends of the two keyhole apertures with the left and right connector pegs, such that the distal heads prevent removal of the unflexed frame.

20 Claims, 9 Drawing Sheets

(56) References Cited

FOREIGN PATENT DOCUMENTS

| | | |
|---|---|---|
| KR | 2020120000956 U | 2/2012 |
| KR | 1020170017243 A | 2/2017 |
| WO | WO2006099508 | 9/2006 |

* cited by examiner

PRESCRIPTION LENS INSERT FOR EYEWEAR

CROSS-REFERENCES

The following applications and materials are incorporated herein, in their entireties, for all purposes: U.S. Provisional Patent Application Ser. No. 63/175,468, filed Apr. 15, 2021.

FIELD

This disclosure relates to systems and methods for eyewear. More specifically, the disclosed embodiments relate to accommodations for prescription lenses in protective and sports-related eyewear.

INTRODUCTION

Protective eyewear is utilized in a variety of professions and during a variety of commercial and recreational activities. Generally, protective eyewear protects the eyes of a wearer from a variety of substances and objects which can interfere with a wearer's vision or damage a wearer's eyes, such as irritants, projectiles, sprays of liquid, and/or the like. Protective eyewear may be utilized in a variety of professions, such as manufacturing, construction, maintenance, repair, medical professions, and/or the like. Protective eyewear may also be utilized in a variety of recreational activities, such as snow sports, water sports, sand sports, dirt biking, cycling, motorsports, motorcycling, and/or the like.

Corrective lenses are utilized by many individuals to improve their vision. Prescription protective eyewear may be expensive and difficult to manufacture. Protective eyewear, such as goggles or sport sunglasses, often have lenses which are shaped quite differently from conventional corrective lenses. Additionally, prescription protective eyewear is generally only usable by a single user, which may further increase personal protective equipment costs and require custom solutions.

SUMMARY

The present disclosure provides systems, apparatuses, and methods relating to prescription eyewear inserts.

In some examples, a prescription lens insert for eyewear includes: a frame including a left rim and a right rim, each configured to hold a respective lens; a bridge coupling the left rim to the right rim, the bridge configured to flex elastically, such that medial edges of the rims are transitionable toward and away from each other; and a respective connection tab extending from the medial edge of each of the rims, each connection tab comprising an aperture, each aperture including a first end portion having a first dimension and a second end portion having a second dimension smaller than the first dimension; wherein an axis extending between the first end portion and the second end portion has a non-vertical orientation.

In some examples, a method for adding prescription lenses to nonprescription protective eyewear includes: removing a nose pad from a pair of protective glasses to expose left and right connector pegs, each of the connector pegs extending rearward from a posterior side of the protective glasses and including a shaft portion and a distal head having a larger outer dimension than the shaft portion; flexing a frame of a prescription lens insert, such that left and right rims of the frame are displaced mediolaterally to align respective larger ends of two apertures with the left and right connector pegs; disposing the prescription lens insert over the left and right connector pegs, such that the distal heads of the connector pegs pass through the two apertures of the frame and the apertures are disposed adjacent the shaft portions of the connector pegs; unflexing the frame of the prescription lens insert to align respective smaller ends of the two apertures with the left and right connector pegs, such that the distal heads prevent removal of the unflexed frame; and installing the nose pad to cover the left and right connector pegs.

In some examples, a method for adding prescription lenses to nonprescription protective eyewear may include: flexing a bridge portion of a frame of a prescription lens insert, such that left and right rims of the frame are displaced mediolaterally to align respective larger ends of two keyhole apertures of the frame with left and right mushroom-shaped connector pegs protruding rearward from a pair of protective glasses; disposing the prescription lens insert over the left and right connector pegs, such that distal heads of the connector pegs pass through the two keyhole apertures of the frame and the keyhole apertures are disposed adjacent shaft portions of the connector pegs; and unflexing the frame of the prescription lens insert to align respective smaller ends of the two keyhole apertures with the left and right connector pegs, such that the distal heads prevent removal of the unflexed frame.

Features, functions, and advantages may be achieved independently in various embodiments of the present disclosure, or may be combined in yet other embodiments, further details of which can be seen with reference to the following description and drawings.

DETAILED DESCRIPTION

Figure 1:
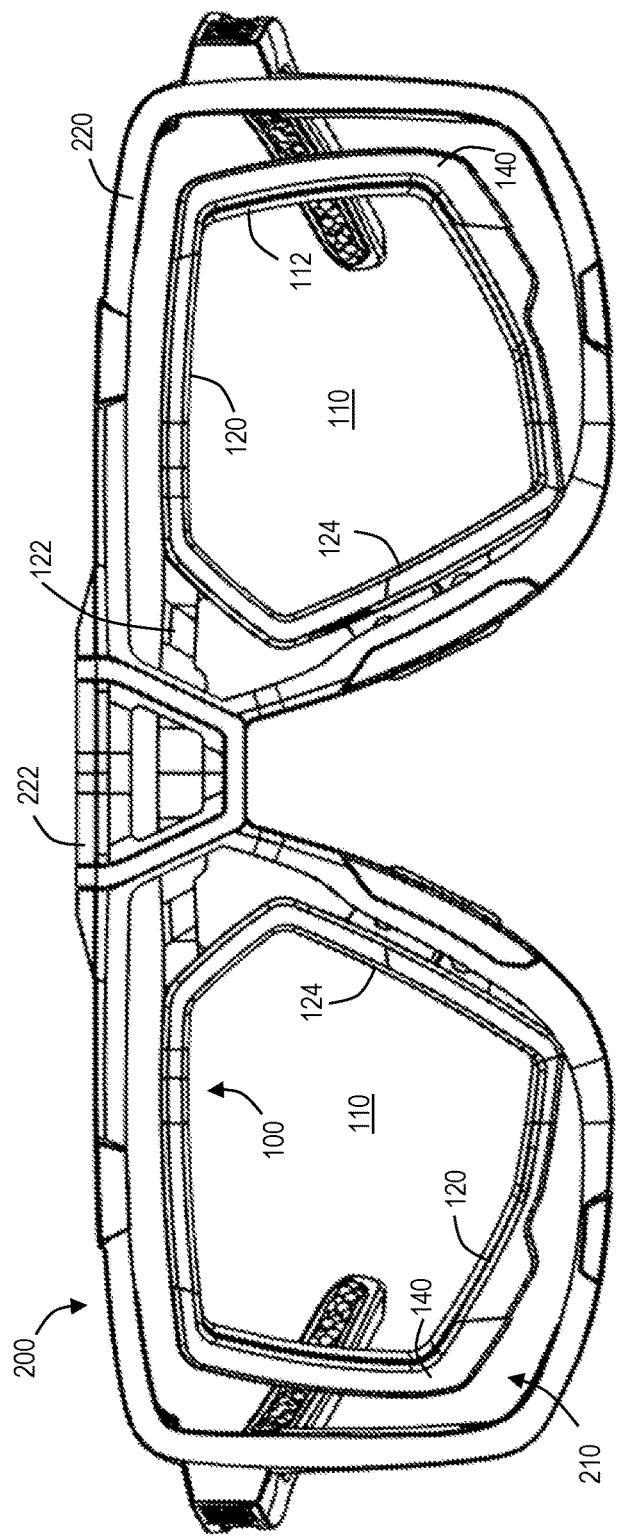
FIG. 1 is a front view of a first illustrative prescription insert for eyewear, coupled to an illustrative pair of protective glasses.
Figure 2:
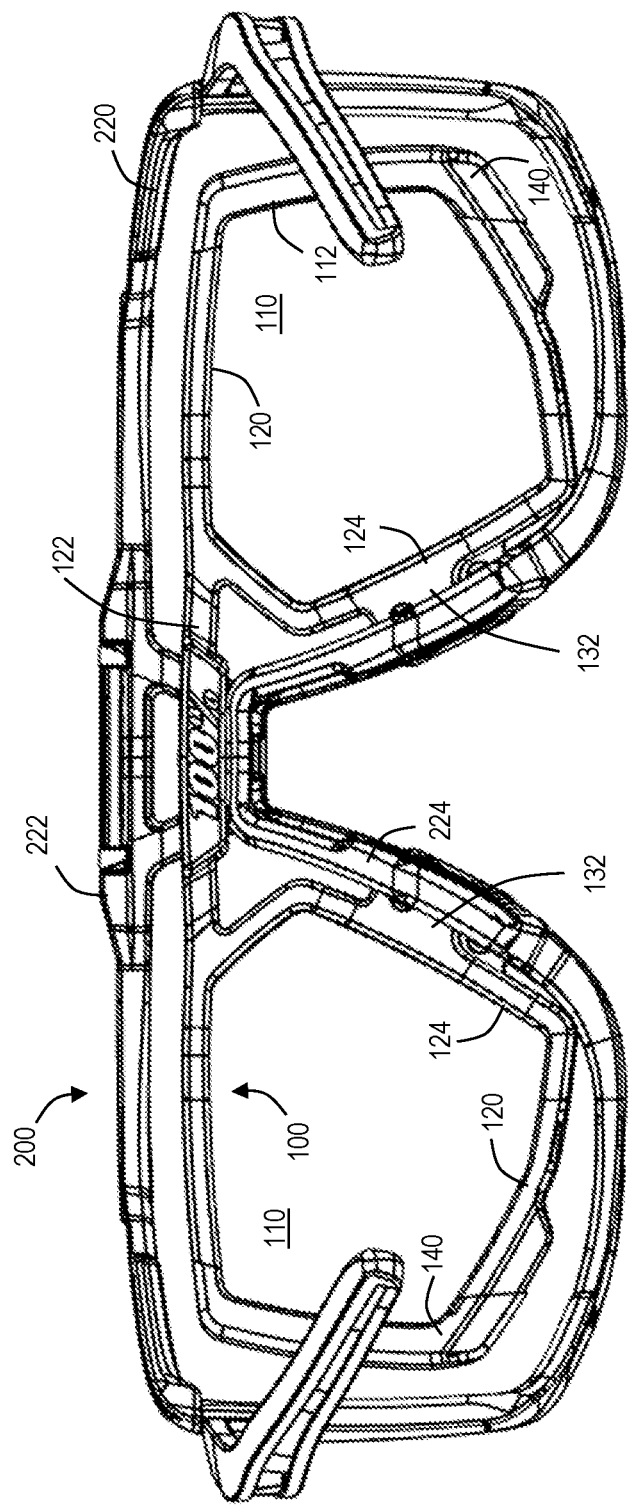
FIG. 2 is a rear view of the prescription insert and protective glasses of FIG. 1.
Figure 3:
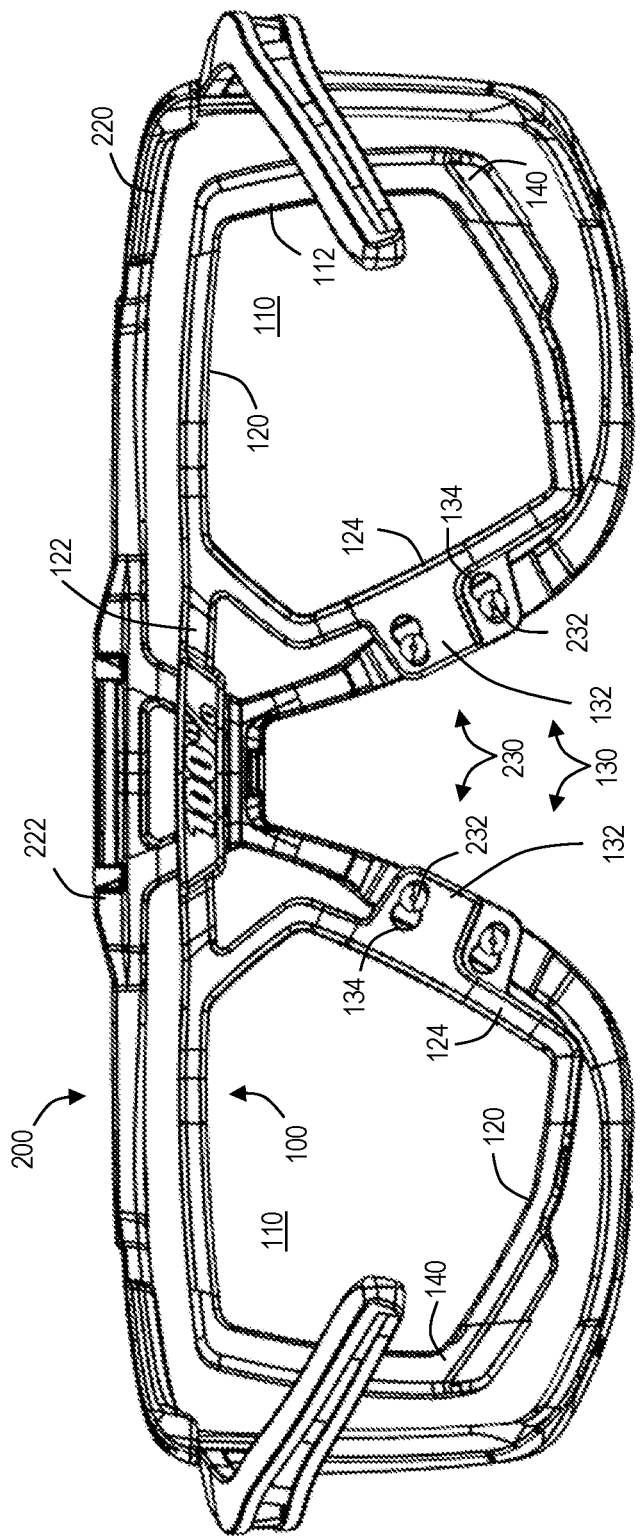
FIG. 3 is a rear view of the prescription insert and protective glasses of FIG. 1, with a nose pad removed to reveal relationships between underlying components.

Various aspects and examples of a prescription insert for eyewear, as well as related methods, are described below and illustrated in the associated drawings. Unless otherwise specified, a prescription insert in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (1) Examples, Components, and Alternatives; (4) Advantages, Features, and Benefits; and (5) Conclusion. The Examples, Components, and Alternatives section is further divided into subsections, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Elongate" or "elongated" refers to an object or aperture that has a length greater than its own width, although the width need not be uniform. For example, an elongate slot may be elliptical or stadium-shaped, and an elongate candlestick may have a height greater than its tapering diameter. As a negative example, a circular aperture would not be considered an elongate aperture.

"Coupled" means connected, either permanently or releasably, whether directly or indirectly through intervening components.

"Resilient" describes a material or structure configured to respond to normal operating loads (e.g., when compressed) by deforming elastically and returning to an original shape or position when unloaded.

"Rigid" describes a material or structure configured to be stiff, non-deformable, or substantially lacking in flexibility under normal operating conditions.

"Elastic" describes a material or structure configured to spontaneously resume its former shape after being stretched or expanded.

"Providing," in the context of a method, may include receiving, obtaining, purchasing, manufacturing, generating, processing, preprocessing, and/or the like, such that the object or material provided is in a state and configuration for other steps to be carried out.

Anatomy-related terms, such as "medial," "lateral," and the like, are intended to refer to anatomical directions corresponding to a human head or face of a wearer of the eyewear in question. For example, "medial" refers to a relative position disposed toward the center of the human body, while "lateral" refers to a relative position disposed away from the center of the human body. Similarly, terms such as "front" and "rear" of the eyewear should be interpreted in the context of how the eyewear is normally worn, e.g., with the front side facing away from a wearer's face and the rear side facing toward the wearer's face. In the absence of a wearer, the same directional terms may be used as if the eyewear were being worn in its expected configuration.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

In general, a prescription eyewear insert in accordance with the present teachings may include a pair of rims coupled together by a nose bridge, each of the rims being configured to receive and retain a respective lens (e.g., a corrective lens).

The lenses may have any suitable shape for corrective lenses, but may generally be shaped similarly to conventional glasses lenses, or may vary slightly from conventional glasses lenses in shape and/or size. Accordingly, the rims define apertures which may be any suitable shape for receiving corrective lenses, conventional or otherwise, such as rectangular, ovular, pentagonal, trapezoidal, hexagonal, heptagonal, octagonal, oblong, round, etc. In some examples, the prescription eyewear insert is configured to provide a maximized field of view. Accordingly, lens size may be configured to provide vision correction from a wide variety of angles, and rim thickness may be configured such that a user does not perceive the prescription eyewear insert when in use.

Rims according to the present teachings may comprise any suitable material for eyewear, such as metal, plastic, wood, rubber, and/or the like. In some examples, the rims may have one or more visual characteristics, such as being transparent, opaque, tinted translucent, matte, painted, colored, and/or the like. In some examples, the rim may comprise a matte material, which may reduce and/or eliminate glare, refraction, and/or visual distortion experienced by a user.

Prescription eyewear inserts according to aspects of the present disclosure are configured to be coupled to one or more pairs of protective eyewear, such as safety glasses, aerodynamic glasses, sports sunglasses, goggles, and/or the like. Accordingly, rims of the prescription eyewear inserts may include and/or define attachment features, configured to interface with corresponding attachment features of the protective eyewear. Attachment features of the prescription eyewear inserts may include any suitable features for releasably coupling two components, such as pegs, pins, hooks, apertures, recesses, and/or the like. Attachment features of the protective eyewear may include any suitable corresponding features configured to releasably mate with the corresponding attachment features of the inserts.

In some examples, rims according to the present teachings include one or more holes or apertures configured to receive one or more pegs of the protective eyewear. In some examples, each rim includes one or more tabs or flanges coupled to a medial edge of the rim, each of which defines an aperture. In some examples, each aperture is a keyhole slot, having a larger diameter portion and a smaller diameter portion. Pegs of the protective eyewear may be mushroom-shaped, including enlarged portions (e.g., balls) at distal ends of the pegs. The pegs fit into or through the apertures of the rims, and the enlarged portions help to secure the prescription eyewear inserts to the protective eyewear. In some examples, the larger diameter portion of the keyhole aperture fits over the enlarged part of the pegs, while the smaller diameter portion of the keyhole aperture will not fit over that enlarged part. Accordingly, the pegs may be removable only through the larger diameter portion of the keyhole aperture. In some examples, the keyhole apertures may be disposed such that the pair of rims can be elastically pinched and/or squeezed laterally toward each other to install the prescription eyewear insert onto the pegs of the protective eyewear.

In some examples, rims according to the present teachings may include a bumper portion. The bumper portion may comprise a resilient material, such as a thermoplastic elastomer, a vulcanized insulation rubber, and/or the like. In some examples, the bumper portion is overmolded onto the rim, and/or is formed as a single piece with the rim. In some examples, the rims include features configured to improve adhesion with an overmolded bumper portion, such as apertures, pegs, castellations, protrusions, grooves, and/or the like. Accordingly, when the bumper portion is overmolded onto the rims, material of the overmolded bumper portion interfaces with the adhesion features, increasing surface area, and therefore surface adhesion between the bumper portion and the rims. The bumper portion may be comparatively more resilient than the rims, and may prevent the rims from damaging lenses of the protective eyewear when the eyewear is exposed to impacts or shocks.

In some examples, protective eyewear according to aspects of the present disclosure includes a removable nose pad, which is coupled to pegs of the protective eyewear. In some examples, coupling the prescription eyewear insert to the protective eyewear includes removing the nose pad, placing apertures of the prescription eyewear insert over the pegs of the protective eyewear, and replacing the nose pad, such that the prescription eyewear insert is held between the protective eyewear and the nose pad. In some examples, the nose pad includes additional attachment features configured to interface with complementary attachment features of the prescription eyewear insert.

In some examples, a method of installing or mounting a prescription eyewear insert onto protective eyewear includes: removing a nose pad from pegs of the protective eyewear, aligning apertures of the rims with the pegs by pinching rim portions of the prescription eyewear insert laterally toward each other, sliding keyhole apertures of the insert over the pegs of the protective eyewear insert, releasing the prescription eyewear insert such that the prescription eyewear insert is secured to the protective eyewear, and replacing the nose pad onto the pegs of the protective eyewear.

In some examples, a method of installing a prescription eyewear insert onto protective eyewear includes: removing a nose pad from pegs of the protective eyewear, sliding a first keyhole aperture of the insert over a first peg of the protective eyewear, pinching rim portions of the prescription eyewear insert such that lenses of the eyewear insert move laterally toward each other, sliding a second keyhole aperture of the insert over a second peg of the protective eyewear, releasing the prescription eyewear insert such that the prescription eyewear insert is secured to the protective eyewear, and replacing the nose pad onto the pegs of the protective eyewear, thereby sandwiching the insert between the nose pad and the protective eyewear.

EXAMPLES, COMPONENTS, AND ALTERNATIVES

The following sections describe selected aspects of illustrative prescription eyewear inserts as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Prescription Eyewear Inserts

As shown in FIGS. 1-11, this section describes a first prescription eyewear insert 100 and a second insert 100, each of which is an example of the inserts described in the overview above. The inserts are configured to be coupled to protective eyewear, such as illustrative protective eyewear 200.

FIGS. 1-5 are various views of a prescription eyewear insert 100 in combination with protective eyewear 200. FIGS. 6-11 depict the prescription insert in isolation, from various perspectives. Insert 100 includes a pair of corrective lenses 110, each of which is received by an aperture 112 defined by a respective rim 120. The rims are coupled together by a bridge portion 122. Protective eyewear 200 includes one or more lenses 210 (e.g., non-prescription lenses) coupled to a frame 220. Frame 220 may partially or completely enclose lens(es) 210. Frame 220 may further define a bridge portion 222, and a nose pad 224 is removably coupled to the frame to provide comfort to the user.

Corrective lenses 110 may have any suitable shape for corrective lenses, and may generally be shaped similarly to conventional eyeglass lenses, or may vary only slightly from conventional lenses in shape and/or size. Accordingly, rims 120 may define apertures which may be any suitable shape for receiving corrective lenses, such as rectangular, ovular, pentagonal, trapezoidal, hexagonal, heptagonal, octagonal, polygonal, oblong, round, and/or the like. In some examples, prescription eyewear insert 100 is configured to provide a clear field of view for the user. Accordingly, a size and/or thickness of corrective lenses 110 may be configured to provide a maximum level of vision correction while ensuring a user does not perceive the prescription eyewear insert when in use.

Rims 120 may comprise any suitable material for eyewear, such as metal, plastic, wood, rubber, and/or the like. In some examples, rims 120 are configured to be transparent, tinted, tinted translucent, opaque, painted, colored, and/or any combination of these. In this context, the terms translucent, transparent, and opaque are used with respect to visible light. In some examples, rims 120 comprise a matte material, which may reduce and/or eliminate glare, refraction, and/or visual distortion experienced by a user. In some examples, rims and/or bridge portion 122 comprise a flexible material configured to permit flexing or bending of the rims toward and away from each other, e.g., mediolaterally. In other words, rims 120 and/or bridge portion 122 may be resilient. In the depicted example, bridge portion 122 is an elongate, generally straight member extending from top sides of the left and right rims. Bridge portion 122 may be disposed at an upper end of the frame, such that flexing the bridge portion sufficiently displaces the lower end of the rims toward and away from each other. See double-headed arrows of FIG. 8.

As prescription eyewear insert 100 is configured to be coupled to protective eyewear 200, rims 120 include one or more attachment features 130, which interface or mate with corresponding attachment features 230 of protective eyewear 200. Attachment features 130 of prescription eyewear insert 100 may include any suitable features for releasably coupling two components, such as pegs, pins, hooks, apertures, recesses, and/or the like, whether male or female. As depicted in FIGS. 1-6, 8, and 9, attachment features 130 in this example comprise keyhole apertures having a smaller inboard or medial end and a larger outboard or lateral end. In some examples, the smaller and larger ends are reversed, and in some examples, differently shaped apertures are utilized. For example, some examples include rectilinear (e.g., rectangular or square) apertures, elliptical, and/or round apertures having a uniform diameter. Corresponding attachment features 230 of protective eyewear 200 may include any suitable features corresponding to the expected attachment features 130. Attachment features 130 of the insert and attachment features 230 of the protective eyewear operably couple together to secure prescription eyewear insert 100 onto protective eyewear 200. In the example of eyewear 200, attachment features 230 include mushroom-shaped connector pegs 232 having a base shaft protruding rearward from frame 220 and terminating in an enlarged distal head.

Rims 120 each define a substantially straight and/or minimally curved medial edge 124, extending away from bridge portion 122 at an angle, and provide a suitable surface to which attachment features 130 may be coupled. In some examples, attachment features 130 include a pair of tabs 132 (also referred to as protrusions, flanges, or extensions) which extend from medial edges 124 of rims 120. In some examples, tabs 132 are formed as a single piece with rims 120. Medial edges 124 may extend at an angle away from bridge portion 122. Tabs 132 may be generally rectangular in shape, and may extend from the medial edges, with a long edge of each rectangular tab oriented parallel to a respective medial edge of the rim. In some examples, tabs 132 include two portions having different thickness and/or differing positions, such that the portions are stepped with respect to each other. Each of these portions includes a respective attachment feature, in this case a keyhole aperture.

Tabs 132 may each define one or more apertures 134 configured to receive associated pegs, pins, protrusions, and/or the like, of the protective eyewear (e.g., pegs 232). In the depicted example, each aperture 134 is a keyhole aperture or slot, having a larger dimension (e.g., diameter or width) portion 136 which narrows gradually or stepwise to a smaller dimension (e.g., diameter or width) portion 138. Although the depicted example shows the larger dimension portions disposed outboard or laterally with respect to the smaller dimension portions, this may be reversed in some examples. Accordingly, pegs 232 coupled to the protective eyewear include enlarged heads configured to at least partially secure the prescription eyewear inserts to the protective eyewear. Dimensions of the heads are smaller than the larger diameter portion of the keyhole aperture and larger than the smaller diameter portion, such that the connector pegs are removable only through the larger diameter portion of the keyhole aperture. In some examples, the keyhole apertures may be disposed such that smaller diameter portion 138 is disposed medially to larger diameter portion 136, such that rims 120 must be pinched and/or squeezed laterally toward each other to install the prescription eyewear insert onto pegs 232 of the protective eyewear. In some examples, the keyhole apertures may be disposed such that larger diameter portion 136 is disposed medially to smaller diameter portion 138, such that rims 120 must be pulled laterally away from each other to install the prescription eyewear insert onto the pegs of the protective eyewear.

In some examples, rims according to the present teachings include a bumper portion 140 configured to prevent damage to the rims and/or the nearby lens of the protective glasses. Bumper portion 140 may comprise a resilient elastomer or similar material, such as a thermoplastic elastomer, a vulcanized insulation rubber, and/or the like. In some examples, bumper portion 140 is overmolded onto rim 120 during the manufacturing process. In some examples, rims 120 include features configured to improve the connection between the bumper and the rim, such as apertures, pegs, castellations, protrusions, grooves, and/or the like. Accordingly, when bumper portion 140 is overmolded onto the rims, material of the overmolded bumper portion interfaces with these features. Bumper portion 140 may be comparatively more resilient than rims 120, and may prevent the rims from damaging lenses of the protective eyewear when the eyewear is exposed to impacts or shocks. In some examples, bumpers 140 are configured to generally remain in contact with the lens of the protective eyewear. In some examples, rims 120 and/or bridge portion 122 are flexed rearward (e.g., intentionally) when the bumpers contact the lens of the protective glasses.

Figure 4:
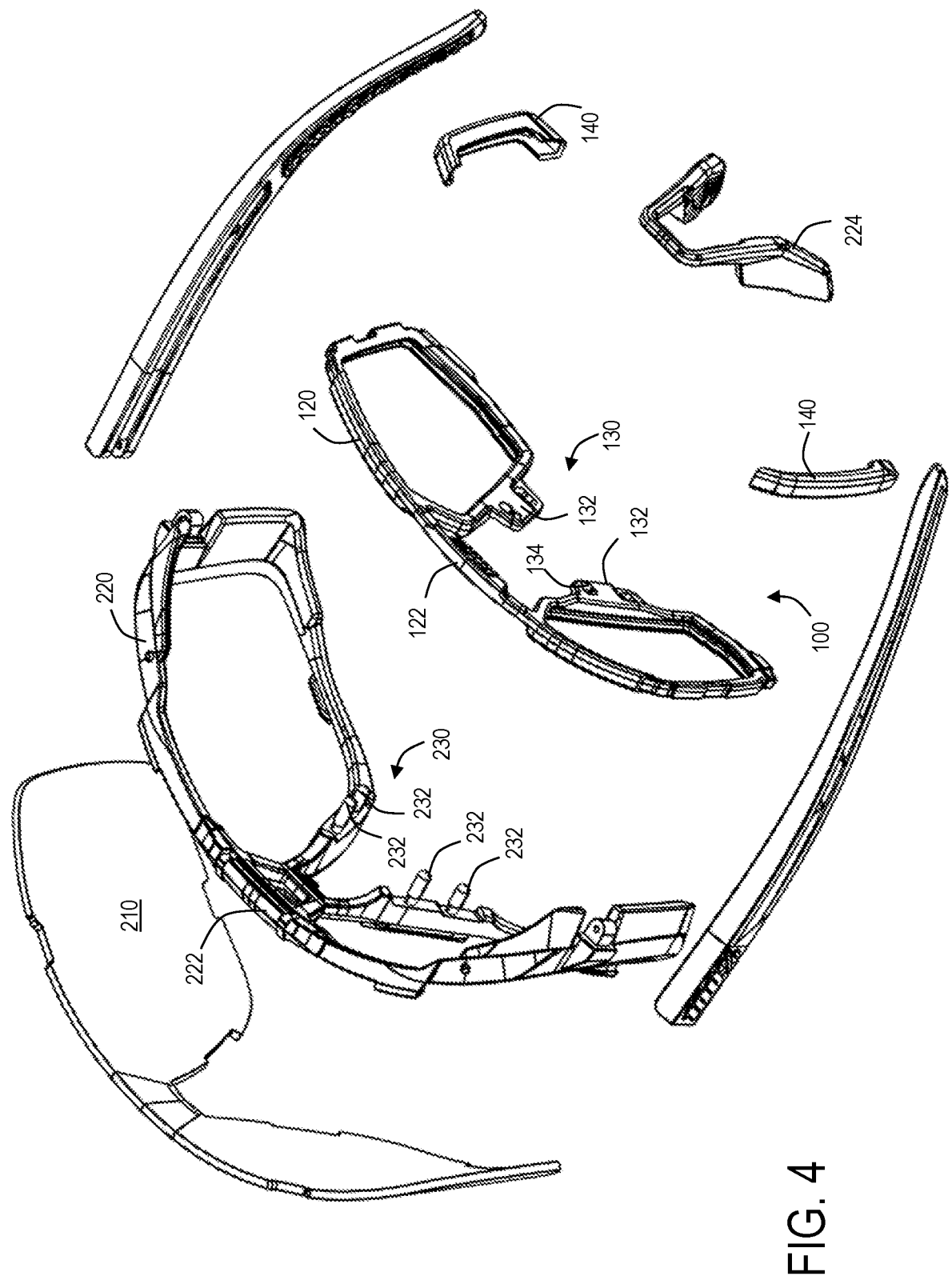
FIG. 4 is an isometric exploded view of the prescription insert and protective glasses of FIG. 1, from a rear upper perspective.
Figure 5:
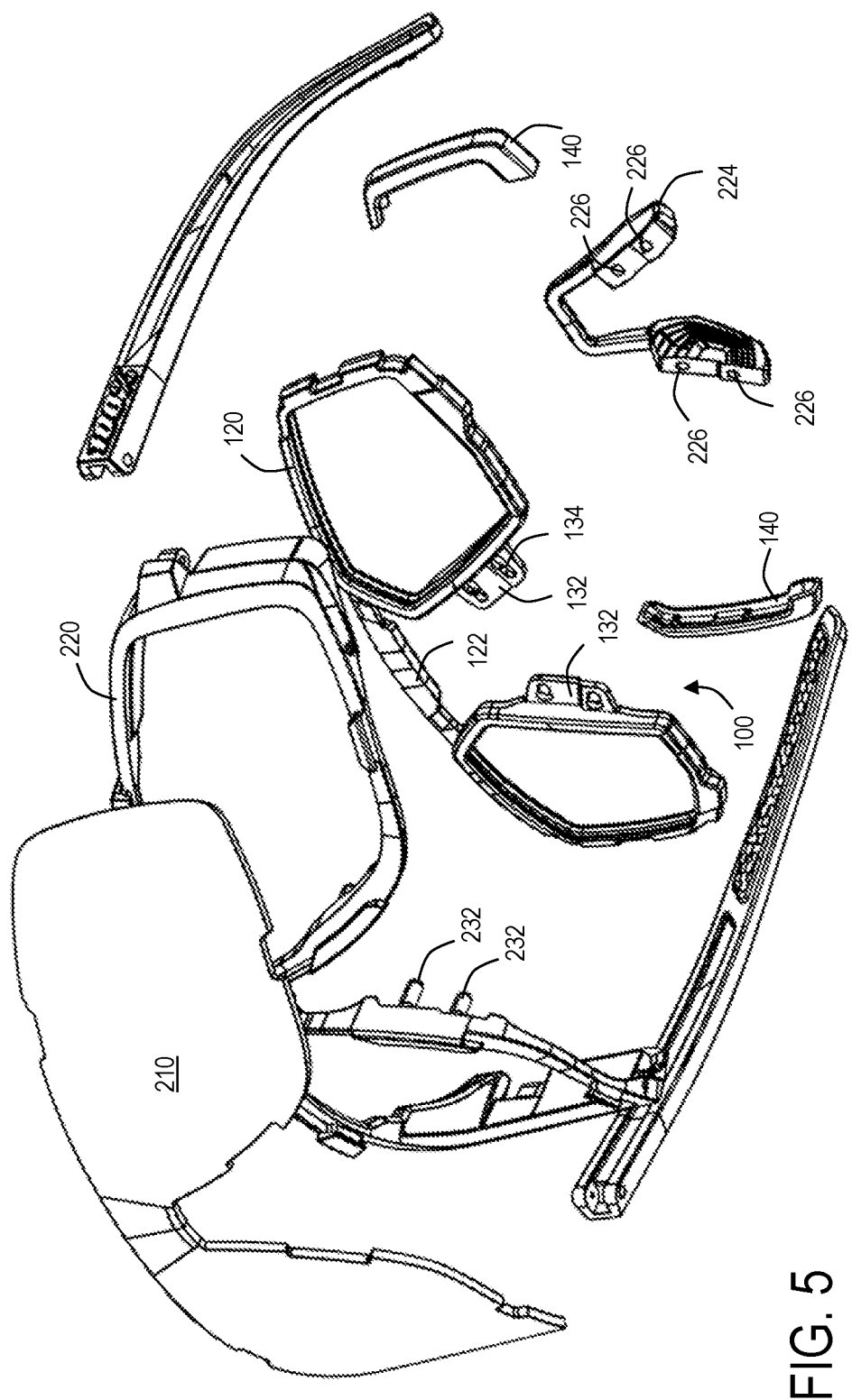
FIG. 5 is an isometric exploded view of the prescription insert and protective glasses of FIG. 1, from a front lower perspective.
Figure 6:
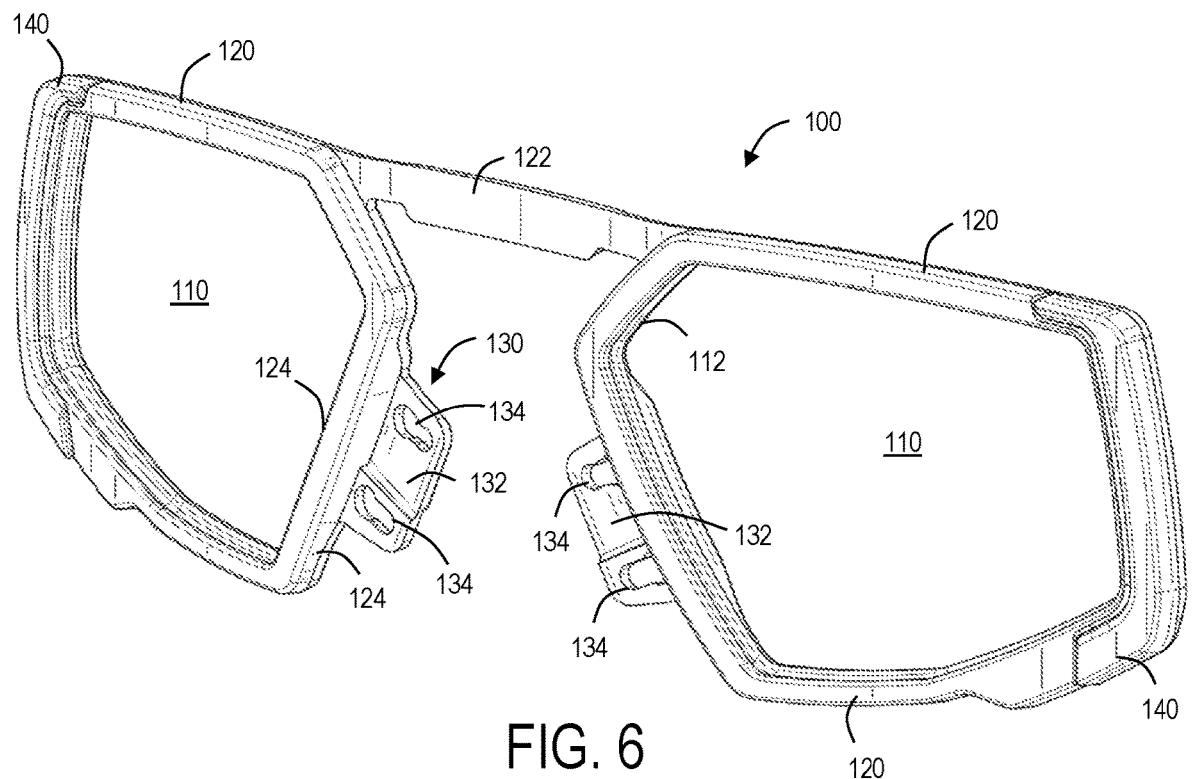
FIG. 6 is an isometric view of the prescription insert of FIG. 1.
Figure 7:
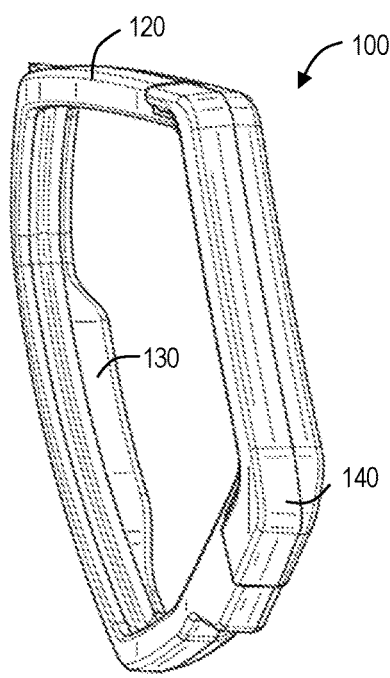
FIG. 7 is a side view of the prescription insert of FIG. 1.
Figure 8:
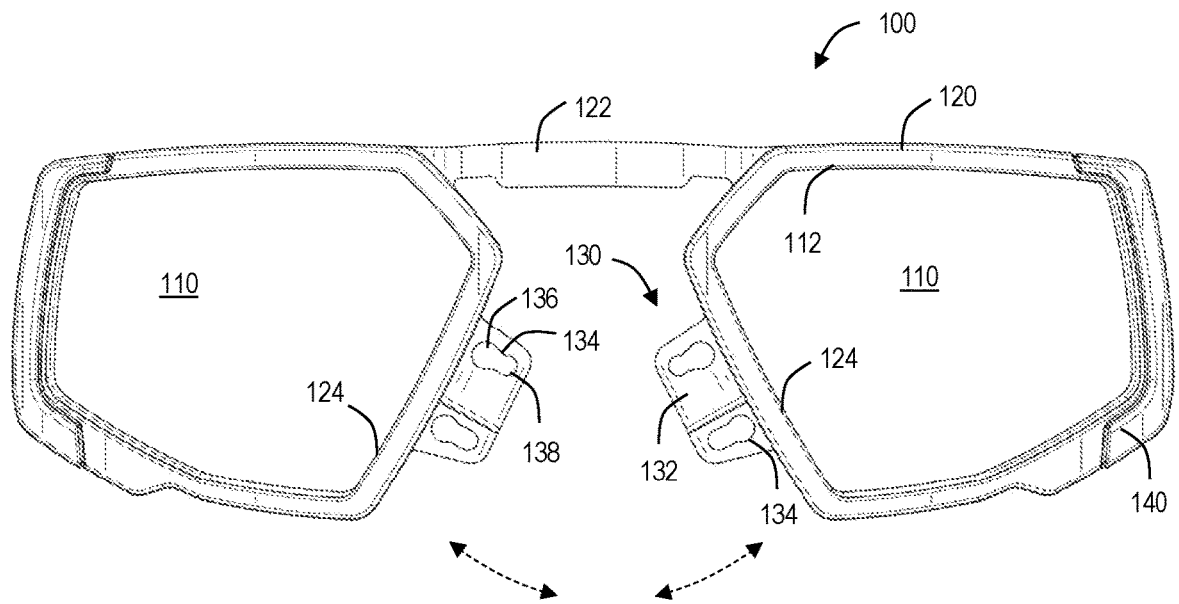
FIG. 8 is a front view of the prescription insert of FIG. 1.
Figure 9:
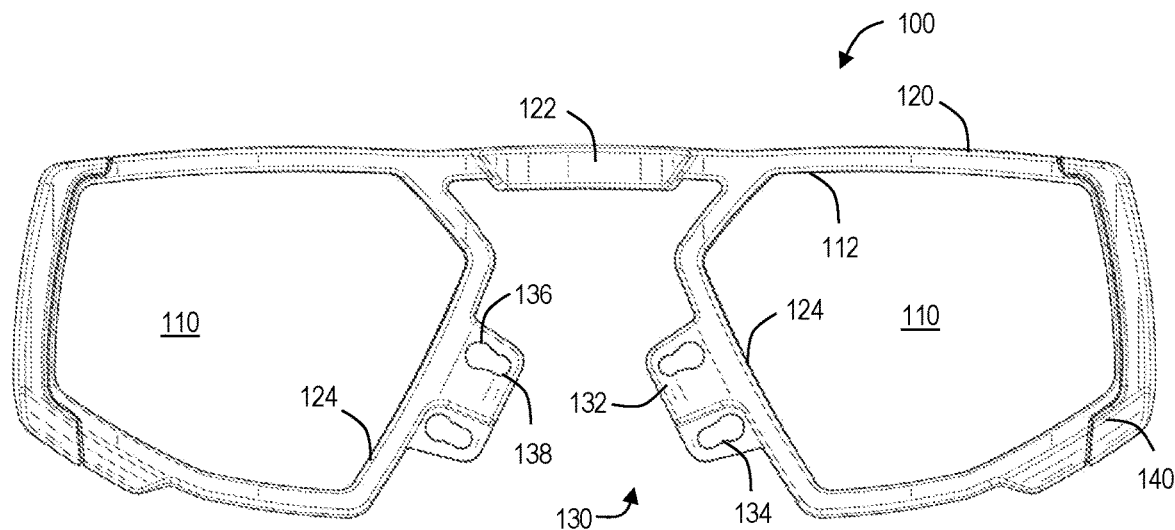
FIG. 9 is a rear view of the prescription insert of FIG. 1.
Figure 10:
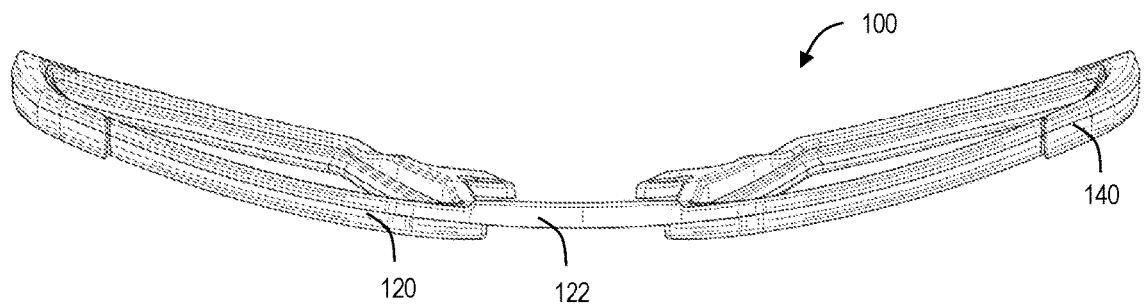
FIG. 10 is a top view of the prescription insert of FIG. 1.
Figure 11:
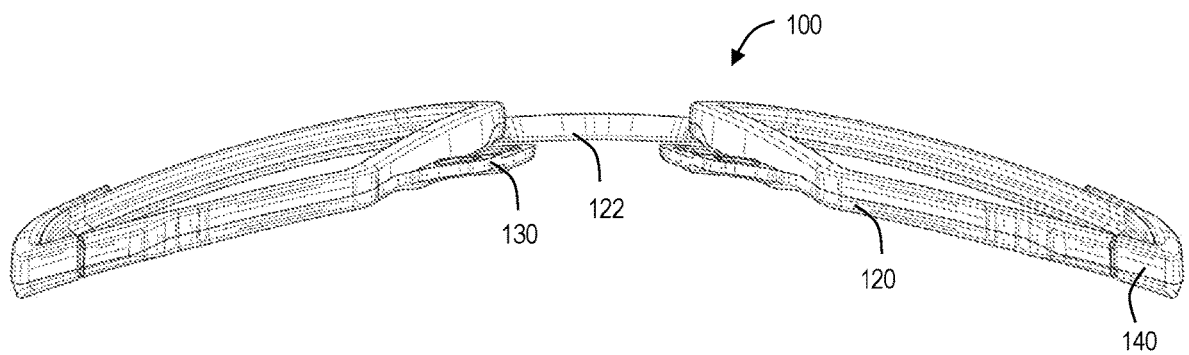
FIG. 11 is a bottom view of the prescription insert of FIG. 1.

FIGS. 4 and 5 are exploded views of the prescription insert and protective glasses of FIG. 1, from two different perspectives. As shown particularly in FIG. 5, nose pad 224 includes apertures 226 configured to releasably receive connector pegs 232, such that the nose pad is retained on the frame of eyewear 200. When insert 100 is installed, nose pad 224 is replaced over the pegs to sandwich the tabs of insert 100 between the frame of the protective eyewear and nose pad 224.

The following alphanumerically designated paragraphs provide further description and illustrative combinations of features.

A0. A prescription lens insert for eyewear, the prescription lens insert comprising:
    a frame including a left rim and a right rim, each configured to hold a respective lens;
    a bridge coupling the left rim to the right rim, the bridge configured to flex elastically, such that medial edges of the rims are transitionable toward and away from each other; and
    a respective connection tab extending from the medial edge of each of the rims, each connection tab comprising an aperture, each aperture including a first end portion having a first dimension and a second end portion having a second dimension smaller than the first dimension;
    wherein an axis extending between the first end portion and the second end portion has a non-vertical orientation.

A1. The prescription lens insert of A0, further comprising a left resilient bumper coupled to a lateral edge of the left rim, and a right resilient bumper coupled to a lateral edge of the right rim.

A2. The prescription lens insert of A1, wherein the left resilient bumper and the right resilient bumper each comprise an elastomer overmolded onto the frame.

A3. The prescription lens insert of any one of paragraphs A0 through A2, wherein the first end portion of the aperture is disposed on a lateral side of the second end portion.

A4. The prescription lens insert of any one of paragraphs A0 through A3, wherein the non-vertical orientation is generally mediolateral.

A5. The prescription lens insert of any one of paragraphs A0 through A4, wherein the left rim is closer to the right rim at an upper edge than at a lower edge.

A6. The prescription lens insert of any one of paragraphs A0 through A5, wherein the bridge is an elongate member having a long axis oriented mediolaterally between the left and right rims when unflexed.

A7. The prescription lens insert of A6, wherein the bridge extends from top sides of the left and right rims.

A8. The prescription lens insert of any one of paragraphs A0 through A7, wherein the aperture is keyhole-shaped.

A9. The prescription lens insert of any one of paragraphs A0 through A8, wherein the frame and the connection tabs are formed as a single piece.

B0. An assembly of protective eyewear having a prescription lens insert, comprising:
- a prescription lens insert including a frame having a left rim and a right rim, each configured to hold a respective lens, a bridge coupling the left rim to the right rim, the bridge configured to flex elastically, such that medial edges of the rims are transitionable toward and away from each other, and a respective connection tab extending from the medial edge of each of the rims, each connection tab comprising an aperture; and
- a protective eyewear frame, including a pair of connector pegs extending rearward from a nose bridge portion;
- wherein the prescription lens insert is coupled to the protective eyewear frame by the apertures of the connection tabs received on the pair of connector pegs; and
- wherein a nose pad of the protective eyewear frame is removably installed on the connector pegs to sandwich the prescription lens insert between the nose pad and the protective eyewear frame.

B1. The assembly of B0, wherein the apertures of the connection tabs are keyhole shaped.

B. Illustrative Method

Figure 12:
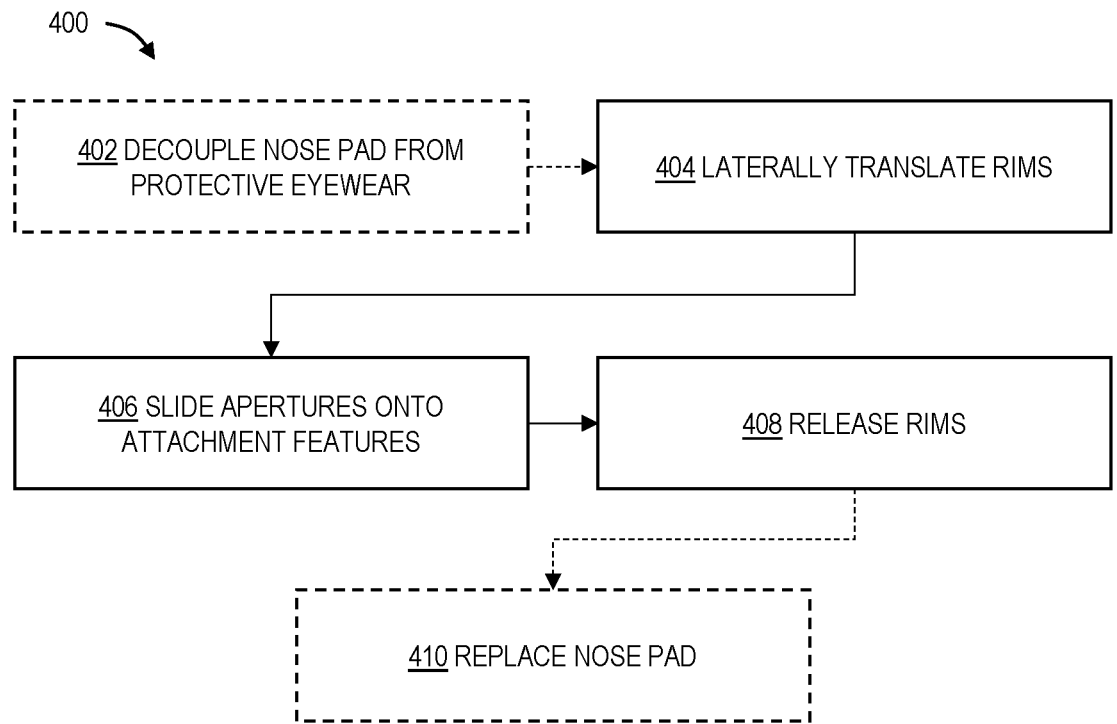
FIG. 12 is a is a flow chart depicting steps of an illustrative method for coupling a prescription eyewear insert to protective eyewear according to the present teachings.

This section describes steps of an illustrative method 400 for coupling a prescription eyewear insert to an article of protective eyewear; see FIG. 12. Aspects of prescription eyewear insert 100 and protective eyewear 200 may be utilized in the method steps described below. Where appropriate, reference may be made to components and systems that may be used in carrying out each step. These references are for illustration, and are not intended to limit the possible ways of carrying out any particular step of the method.

FIG. 12 is a flowchart depicting steps of an illustrative method, and may not recite the complete process or all steps of the method. Although various steps of method 400 are described below and depicted in FIG. 12, the steps need not necessarily all be performed, and in some cases may be performed simultaneously or in a different order than the order shown.

Step 402 of method 400 includes optionally decoupling a nose pad from attachment features (e.g., frame connector pegs) of an article of protective eyewear. In some examples, the nose pad is coupled to attachment features of the protective eyewear. For example, the nose pad may include apertures or recesses configured to receive fixed, mushroom-shaped attachment pegs extending from a nose bridge area of the protective eyewear. Decoupling the nose pad from the attachment features makes the attachment features available for attaching the prescription eyewear insert.

Step 404 of method 400 includes laterally translating corrective lens frames (AKA rims) of the prescription eyewear insert toward each other. In some examples, laterally translating the corrective lens frames includes applying inward pressure to lateral edges of the corrective lenses and/or associated rims such that the rims move toward each other, although any flexing, squeezing, bending, or urging method may be utilized. In some examples, laterally translating the corrective lens frames includes applying outward pressure to medial edges of the corrective lenses and/or associated rim such that the corrective lenses move outward, away from each other. Laterally translating the corrective lens frames facilitates alignment of mounting apertures of the insert with the attachment features (e.g., pegs) of the protective eyewear.

Step 406 of method 400 includes sliding the mounting apertures of the prescription eyewear insert onto the attachment features of the protective eyewear. In some examples, the attachment features comprise elongate, mushroom-headed protrusions, such as pegs, brads, pins, and/or the like. In some examples, step 404 and 406 are performed simultaneously. In some examples, a user may slide a first attachment feature through a first aperture, laterally translate the corrective lenses, and subsequently slide a second attachment feature through a second aperture.

Step 408 of method 400 includes releasing pressure applied to the corrective lens frames, such that the prescription eyewear insert elastically (i.e., resiliently) returns to its default shape, and is secured onto the protective eyewear. In examples where the apertures of the prescription eyewear insert are keyhole apertures, releasing pressure applied to the corrective lenses secures the eyewear insert to the protective eyewear by returning the apertures to a lateral position where the aperture size no longer accommodates pass-through of the attachment features of the protective eyewear. For example, the attachment features may include mushroomed distal ends, which have a larger diameter than a smallest diameter of the keyhole apertures. Accordingly, the pins are not removable through the keyhole apertures when the pins are disposed in the smallest diameter section of the keyhole apertures.

Step 410 of method 400 includes optionally (re)mounting the nose pad onto the attachment features of the protective eyewear, sandwiching the insert between the nose pad and the protective eyewear. In some examples, sliding the nose pad onto the attachment features further secures the prescription eyewear insert to the protective eyewear.

Further illustrative methods and descriptive features are outlined below, as alphanumerically designated paragraphs, C0. A method for adding prescription lenses to nonprescription protective eyewear, the method comprising:
- removing a nose bridge from a pair of protective glasses to expose left and right connector pegs, each of the connector pegs extending rearward from a posterior side of the protective glasses and including a shaft portion and a distal head having a larger outer dimension than the shaft portion;
- flexing a frame of a prescription lens insert, such that left and right rims of the frame are displaced mediolaterally to align respective larger ends of two apertures with the left and right connector pegs;
- disposing the prescription lens insert over the left and right connector pegs, such that the distal heads of the connector pegs pass through the two apertures of the frame and the apertures are disposed adjacent the shaft portions of the connector pegs;

unflexing the frame of the prescription lens insert to align respective smaller ends of the two apertures with the left and right connector pegs, such that the distal heads prevent removal of the unflexed frame; and installing the nose bridge to cover the left and right connector pegs.

C1. The method of C0, wherein disposing the prescription lens insert over the left and right connector pegs further comprises flexing lateral ends of the frame rearward as the lateral ends come into contact with a lens of the protective glasses.

C2. The method of C0 or C1, wherein elastomeric bumpers are disposed on lateral ends of the frame of the prescription lens insert.

C3. The method of any one of paragraphs C0 through C2, wherein disposing the prescription lens insert over the left and right connector pegs comprises disposing the prescription lens insert over the left and right connector pegs simultaneously.

C4. The method of any one of paragraphs C0 through C3, wherein for each of the connector pegs the shaft portion is longer than the distal head.

C5. The method of any one of paragraphs C0 through C4, wherein the distal heads of the connector pegs and the larger ends of the apertures have corresponding shapes.

C6. The method of C5, wherein the corresponding shapes are circular.

D0. A method for adding prescription lenses to nonprescription protective eyewear, the method comprising:

flexing a bridge portion of a frame of a prescription lens insert, such that left and right rims of the frame are displaced mediolaterally to align respective larger ends of two keyhole apertures of the frame with left and right mushroom-shaped connector pegs protruding rearward from a pair of protective glasses;

disposing the prescription lens insert over the left and right connector pegs, such that distal heads of the connector pegs pass through the two keyhole apertures of the frame and the keyhole apertures are disposed adjacent shaft portions of the connector pegs; and unflexing the frame of the prescription lens insert to align respective smaller ends of the two keyhole apertures with the left and right connector pegs, such that the distal heads prevent removal of the unflexed frame.

D1. The method of D0, wherein the keyhole apertures are disposed in tabs extending mediolaterally from medial edges of the rims, and the keyhole apertures are each oriented such that the larger end of the keyhole is outboard of the smaller end of the keyhole.

D2. The method of D0 or D1, wherein flexing the bridge portion comprises flexing the bridge portion to bring medial edges of the rims closer together.

D3. The method of any one of paragraphs D0 through D2, further comprising installing a nose bridge of the protective glasses onto the left and right connector pegs to secure the prescription lens insert to a frame of the protective glasses.

ADVANTAGES, FEATURES, AND BENEFITS

The different embodiments and examples of the prescription inserts for eyewear described herein provide several advantages over known solutions for prescription lenses for protective eyewear. For example, illustrative embodiments and examples described herein reduce cost of protective eyewear for users of corrective lenses.

Additionally, and among other benefits, illustrative embodiments and examples described herein allow easy mounting of a single insert or type of insert onto various forms of protective eyewear having a universal mounting topology. For example, the same prescription insert can be utilized with many different styles of protective eyewear or sunglasses as long as each of them has the mounting pegs.

Additionally, and among other benefits, illustrative embodiments and examples described herein have resilient bumpers to protect lenses of the protective eyewear from scratching by corrective lenses.

Additionally, and among other benefits, illustrative embodiments and examples described herein allow a simple and intuitive method for attaching and removing the insert, without the use of tools. Mounting structures of the insert (e.g., keyhole slots) are integrated into the frame of the insert, with no moving parts.

Additionally, and among other benefits, illustrative embodiments and examples described herein have inserts that share the same mounting structures as the nose pad, enabling retrofitting, seamless use of the protective eyewear with and without the insert, and the manufacturing efficiency of a common interface.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

The invention claimed is:

1. A prescription lens insert for eyewear, the prescription lens insert comprising:
    a frame including a left rim and a right rim, each configured to hold a respective lens;
    a bridge coupling the left rim to the right rim, the bridge configured to flex elastically, such that medial edges of the rims are transitionable toward and away from each other; and
    a respective connection tab extending from the medial edge of each of the rims, each connection tab comprising an aperture, each aperture including a first end portion having a first dimension and a second end portion having a second dimension smaller than the first dimension;
    wherein an axis extending between the first end portion and the second end portion has a non-vertical orientation.

2. The prescription lens insert of claim 1, further comprising a left resilient bumper coupled to a lateral edge of the left rim, and a right resilient bumper coupled to a lateral edge of the right rim.

3. The prescription lens insert of claim 2, wherein the left resilient bumper and the right resilient bumper each comprise an elastomer overmolded onto the frame.

4. The prescription lens insert of claim 1, wherein the first end portion of the aperture is disposed on a lateral side of the second end portion.

5. The prescription lens insert of claim 1, wherein the non-vertical orientation is generally mediolateral.

6. The prescription lens insert of claim 1, wherein the left rim is closer to the right rim at an upper edge than at a lower edge.

7. The prescription lens insert of claim 1, wherein the bridge is an elongate member having a long axis oriented mediolaterally between the left and right rims when unflexed.

8. The prescription lens insert of claim 1, wherein the aperture is keyhole-shaped.

9. The prescription lens insert of claim 1, wherein the frame and the connection tabs are formed as a single piece.

10. A method for adding prescription lenses to nonprescription protective eyewear, the method comprising:
   removing a nose pad from a pair of protective glasses to expose left and right connector pegs, each of the connector pegs extending rearward from a posterior side of the protective glasses and including a shaft portion and a distal head having a larger outer dimension than the shaft portion;
   flexing a frame of a prescription lens insert, such that left and right rims of the frame are displaced mediolaterally to align respective larger ends of two apertures with the left and right connector pegs;
   disposing the prescription lens insert over the left and right connector pegs, such that the distal heads of the connector pegs pass through the two apertures of the frame and the apertures are disposed adjacent the shaft portions of the connector pegs;
   unflexing the frame of the prescription lens insert to align respective smaller ends of the two apertures with the left and right connector pegs, such that the distal heads prevent removal of the unflexed frame; and
   installing the nose pad to cover the left and right connector pegs.

11. The method of claim 10, wherein disposing the prescription lens insert over the left and right connector pegs further comprises flexing lateral ends of the frame rearward as the lateral ends come into contact with a lens of the protective glasses.

12. The method of claim 10, wherein elastomeric bumpers are disposed on lateral ends of the frame of the prescription lens insert.

13. The method of claim 10, wherein disposing the prescription lens insert over the left and right connector pegs comprises disposing the prescription lens insert over the left and right connector pegs simultaneously.

14. The method of claim 10, wherein for each of the connector pegs the shaft portion is longer than the distal head.

15. The method of claim 10, wherein the distal heads of the connector pegs and the larger ends of the apertures have corresponding shapes.

16. The method of claim 15, wherein the corresponding shapes are circular.

17. A method for adding prescription lenses to nonprescription protective eyewear, the method comprising:
   flexing a bridge portion of a frame of a prescription lens insert, such that left and right rims of the frame are displaced mediolaterally to align respective larger ends of two keyhole apertures of the frame with left and right mushroom-shaped connector pegs protruding rearward from a pair of protective glasses;
   disposing the prescription lens insert over the left and right connector pegs, such that distal heads of the connector pegs pass through the two keyhole apertures of the frame and the keyhole apertures are disposed adjacent shaft portions of the connector pegs; and
   unflexing the frame of the prescription lens insert to align respective smaller ends of the two keyhole apertures with the left and right connector pegs, such that the distal heads prevent removal of the unflexed frame.

18. The method of claim 17, wherein the keyhole apertures are disposed in tabs extending mediolaterally from medial edges of the rims, and the keyhole apertures are each oriented such that the larger end of the keyhole is outboard of the smaller end of the keyhole.

19. The method of claim 17, wherein flexing the bridge portion comprises flexing the bridge portion to bring medial edges of the rims closer together.

20. The method of claim 17, further comprising:
   installing a nose pad of the protective glasses onto the left and right connector pegs to secure the prescription lens insert to a frame of the protective glasses.

* * * * *